United States Patent [19]
Dawson

[11] 3,943,445
[45] Mar. 9, 1976

[54] APPARATUS FOR SIGNALLING POSITION OF DOWNED AIRCRAFT

[76] Inventor: Edward F. Dawson, 2052 Comox Ave., Comox, British Columbia, Canada, V9N 4A5

[22] Filed: Apr. 8, 1974

[21] Appl. No.: 458,848

[52] U.S. Cl. .............................. 325/115; 325/116
[51] Int. Cl.² ........................................ H04B 1/02
[58] Field of Search .......................... 325/111–116; 9/9; 116/124 B

[56] References Cited
UNITED STATES PATENTS

| | | | |
|---|---|---|---|
| 2,149,808 | 3/1939 | Ellis | 325/115 |
| 2,357,417 | 9/1944 | Marple | 9/9 |
| 2,592,461 | 4/1952 | Perkins et al. | 9/9 |
| 2,825,803 | 3/1958 | Newbrough | 325/114 |
| 3,049,091 | 8/1962 | Carroll et al. | 9/9 |
| 3,253,810 | 5/1966 | Penn | 325/116 |
| 3,586,979 | 6/1971 | Hine | 325/111 |

*Primary Examiner*—Robert L. Griffin
*Assistant Examiner*—Jin F. Ng
*Attorney, Agent, or Firm*—Fetherstonhaugh & Co.

[57] ABSTRACT

Apparatus to be attached to aircraft and containing signalling apparatus which is set into operation when the aircraft is downed either in water or on land. The apparatus includes a releasable element which, when the aircraft becomes submerged, floats to the surface. This element contains signalling means, and switch means which is operated to turn on the signalling means when the releasable element floats away from the aircraft. The apparatus also includes means for operating the switch means in the event of the aircraft crashing on land so as to turn on the signalling means.

13 Claims, 5 Drawing Figures

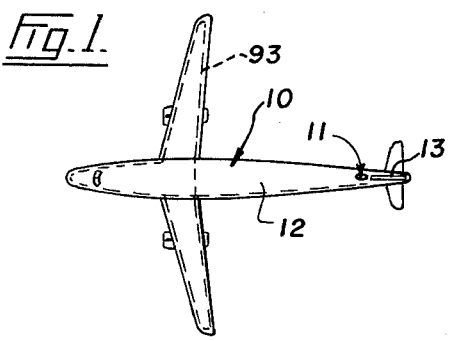
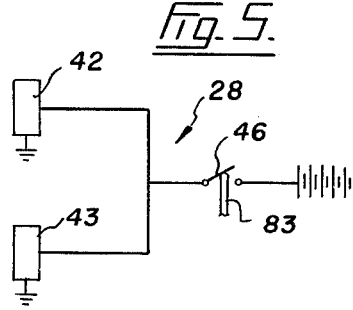
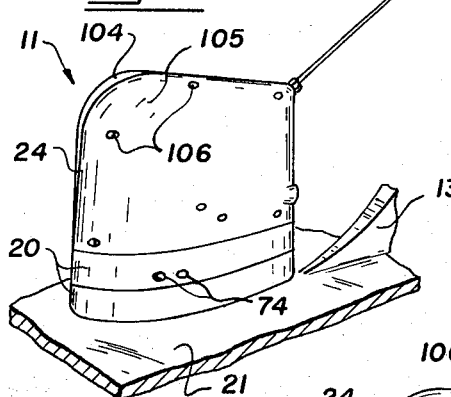
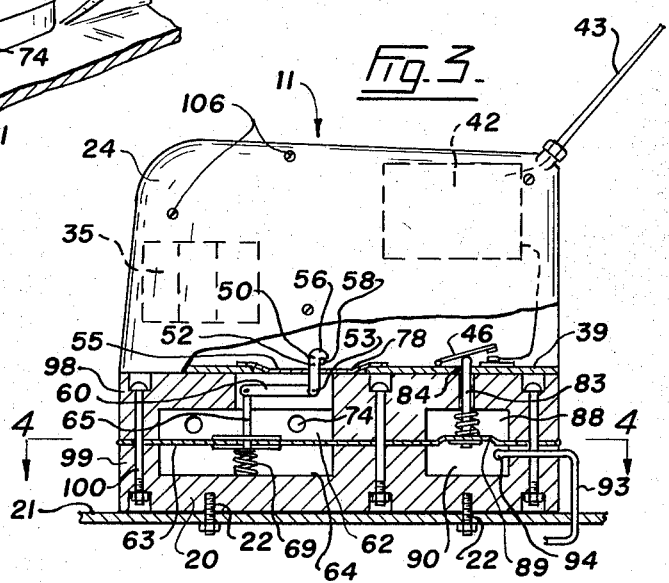
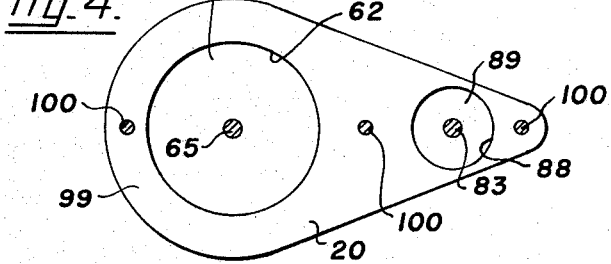

APPARATUS FOR SIGNALLING POSITION OF DOWNED AIRCRAFT

This invention relates to signalling apparatus for attachment to aircraft and operable when the aircraft crashes in water or on land to send out signals.

In spite of the fact that there are many different forms of signalling apparatus for aircraft that go down in remote places or in water, many aircraft which drop into the water are never found. Most of the known signalling apparatus is not operable when submerged in water, and signalling apparatus which is supposed to located submerged aircraft is judging by the results not successful, too complicated or heavy, or is not reliable.

The main purpose of the present invention is to provide very simple and relatively inexpensive signalling apparatus which will commence to operate when the aircraft is submerged, and which is substantially foolproof. This apparatus is so simple that it can hardly fail to operate when needed. In addition, the apparatus is designed to send out signals if the craft crashes on land.

Signalling apparatus is accordance with this invention comprises a buoyant container having therein signalling means and a self-contained electrical operating system therefor, a base adapted to be secured to an aircraft at an outer surface thereof, latch means releasably securing the container to the base, and operating means in the base for said latch means and operable by hydrostatic pressure to cause said latch means to release the container and permit the latter to float to the surface when the portion of the craft to which the base is attached is submerged in water.

In the preferred form of the invention, the apparatus includes switch means in the electrical operating system normally rendering said system inoperative, and an operator for the switch means for causing said switch means to permit the electrical system to operate when the container separates from the base. The value of this apparatus is extended further by including means for causing said switch means to permit the electrical system to operate when the aircraft crashes on the ground.

A preferred form of apparatus in accordance with this invention is illustrated by way of example in the accompanying drawings, in which FIG. 1 is a diagrammatic plan view of an aircraft, showing one position where this signalling apparatus can be installed, FIG. 2 is a perspective view of this signalling apparatus, FIG. 3 is a side elevation, partly in section, of the apparatus, FIG. 4 is a horizontal section taken on the line 4—4 of FIG. 3, and FIG. 5 is a wiring diagram of a signalling system that can be used with this apparatus.

Referring to FIG. 1 of the drawings, 10 is an aircraft having signalling apparatus 11 in accordance with this invention installed thereon. In this example, the apparatus is mounted on top of the fuselage 12 of the craft and just ahead of the vertical tail fin 13. However, apparatus 11 can be mounted in any desired position on the aircraft, but preferably one that is least likely to be destroyed if the aircraft falls into the water or crashes on the ground.

A preferred form of apparatus 11 is illustrated in FIGS. 2 to 5. This apparatus includes a base 20 adapted to be mounted on an aircraft, the illustrated base being mounted on a section 21 of the skin of the craft and secured in position by bolts 22. A buoyant container 24 is associated with base 20, and is preferably mounted on the top thereof, as shown in FIGS. 2 and 3. Container 24 has therein signalling means and a self-contained electrical operating system, such as the one designated 28 in FIG. 5. The signalling means may include a light beacon, although this is not absolutely necessary. Container 24 can be made water-tight for buoyancy reason, and/or it may be formed of suitable buoyant material. As it is desirable to cause chamber 24 to float in an upright position, batteries 35 for the electrical system can be positioned near the container bottom 39 to act as ballast, or a suitable weight, not shown, may be provided.

The electrical operating system includes a transmitter 42 of any well-known type, which is adapted to continuously or intermittently transmit a signal on which searching aircraft home, and an aerial 43 projecting from container 24. The system can also include a visual signal beacon 44, shown only in FIG. 5, and which is illuminated at the time the transmitter starts to operate. In the illustrated system 28, a normally open switch 46 is provided so that when the switch is closed, the transmitter starts to operate.

As stated above, container 24 rests upon the top of base 20, and suitable latch means is provided for releasably connecting these two elements together. In this example, a latch 50 includes a latch arm 52 swingably mounted in base 20 on a pivot pin 53 and projecting upwardly from the base and through an opening 55 in the bottom 39 of the container. This latch arm has a catch 56 on its upper end which normally overlaps and engages a keeper 58 mounted on bottom 39 of the container.

Latch arm 52 is provided at its lower end with a horizontal section 60 which overlies a cavity 62 in the base and having a diaphragm 63 supported therein spaced above its bottom 64. A link 65 connects the free end of arm section 60 with the central portion of the diaphragm. Suitable means is provided for exerting an adjustable resilient upward force on the lower surface of diaphragm 63, and in this example, a spring 69 is provided for this purpose, said spring extending between cavity bottom 64 and the lower surface of the diaphragm.

A plurality of holes 74 are formed in base 20 at cavity 62 to permit water to flow into said cavity when the aircraft with said base are submerged.

Suitable resilient means, such as a spring 78, is positioned between base 20 and container 24 where it is normally compressed therebetween, said latch 50 retaining the spring in this state. When the latch is operated to release container 24, the spring forces the container away from the base.

Switch 46 of signalling system 28 is diagrammatically illustrated in FIG. 3. This switch is normally held open by an operater which, in this example, is a finger 83 mounted on base 20 and projecting upwardly through a hole 84 in the bottom portion of the container. If switch 46 and finger 83 are separated, the switch closes.

Finger 83 can be fixedly mounted in base 20, in which case switch 46 will close only when container 24 moves away from the base. However, it is preferable to provide means for normally holding the finger in its normal position, but will permit the finger to move downwardly in the event of the aircraft crashing on land, as shown.

A chamber 88 is formed in base 20, and a diaphragm 89 extends across this chamber above the bottom 90 thereof. Finger 83 extends into cavity 88 and is secured at its inner end to diaphragm 89. A fragile tube 93 communicates at its end 94 with the portion of chamber 88 below diaphragm 89, and said tube extends throughout portions of the aircraft which are subject to damage if the craft crashes on land, such as indicated by broken lines 93 in FIG. 1. The opposite end of this tube is sealed, and it and the lower portion of chamber 88 are filled with a suitable fluid under pressure. The fluid in the chamber supports diaphragm 89 so that finger 83 is normally retained in its normal position holding switch 46 open. However, if any part of tube 93 is punctured or broken, as when the aircraft crashes on land, the pressure of the fluid in chamber 88 is released, permitting diaphragm 89 to draw finger 83 downwardly to allow switch 46 to close, thus causing transmitter 42 to send out a continuous or intermittent signal.

For the sake of convenience, base 20 is formed in upper and lower sections 98 and 99 held together by a plurality of bolts 100 extending therethrough. With this arrangement, diaphragms 63 and 89 are actually a single diaphragm extending between the two sections of the base and are held in position when the base sections are clamped together by bolts 100.

Similarly, container 24 can be formed in two vertical sections 104 and 105 held together by bolts 106 extending therethrough. Access can be gained to the interior of the container by removing these bolts.

Signalling apparatus 11 is normally inoperative, and is mounted on a section of aircraft 10 where it is out of the way, and is not subject to disturbance during normal servicing and repair of the aircraft. However, if trouble develops in the aircraft and the latter drops into the water, the water enters cavity 62 of base chamber 20, and when the hydrostatic pressure against diaphragm 63 reaches a predetermined level, the diaphragm depresses spring 69 and thereby swings latch arm 52 to disengage catch 56 from keeper 58. This permits container 24 to float upwardly in the water away from the base chamber and to the water surface. This shifts switch 46 away from finger 83 so that the switch is operated to cause transmitter 42 and signal beacon 44, if the latter is present, to go into operation. Container 24 will float in the vicinity of the downed aircraft so that searchers can home on the transmitted signals.

On the other hand, if the aircraft crashes on land, tube 93 will be fractured to allow the fluid in cavity 88 to release diaphragm 89. In this case, the diaphragm draws finger 83 away from switch 46 to permit the latter to close, thereby starting the transmission of the homing signals.

If desired, base 20 may have a compartment, not shown, for a coiled cable, an end of which would be attached to container 24. With this arrangement, when the container floats away from the craft, it would draw the cable out of the base, so that the container would not float too far away from the craft. Furthermore, water-activated dye marker capsules may be included in the container.

I claim:

1. Signalling apparatus for attachment to aircraft and operable when the aircraft crashes, comprising a buoyant container exposed to atmosphere and having therein signalling means and a self-contained electrical operating system therefor, switch means in said electrical operating system normally rendering said system inoperative, a base mountable on an aircraft at an outer surface thereof, latch means releasably securing the container to the base, operating means including a diaphragm mounted in said base and connected to said latch means, means to admit water into the base when the portion of the craft on which the base is mounted is submerged in water whereby hydrostatic pressure in the base and against said operating means causes the latter to operate said latch means to release the container and permit the latter to float to the surface, and an operator for the switch means for causing said switch means to permit the electrical system to operate when the container floats away from the base.

2. Signalling apparatus as claimed in claim 1 in which said switch means comprises a switch in the electrical operating system, and said operator comprises a finger mounted on the base and projecting into the container and normally retaining said switch open, said switch closing when moved clear of the finger.

3. Signalling apparatus as claimed in claim 1 in which said latch means comprises a latch arm movably mounted on the base and projecting into the container and having a catch thereon for engaging a keeper on the container, said operating means being operable to move the catch away from the keeper.

4. Signalling apparatus for attachment to aircraft and operable when the aircraft crashes, comprising a base mountable on an aircraft at an outer surface thereof, a buoyant container mounted on the base so as to be exposed to atmosphere and having therein signalling means and a self-contained electrical operating system therefor, a chamber in the base, a fragile tube closed at one end and in communication at another end with said chamber and mountable along a portion of the aircraft subject to damage if the aircraft crashes, said tube breaking if said portion of the aircraft is subject to extraordinary force, a fluid under pressure in the tube and the chamber, switch means in the electrical operating system, an operator for the switch means extending from the base chamber into the container and normally retained by the fluid in said chamber in a position rendering the electrical operating system inoperative, latch means releasably securing the container to the base, and operating means including a diaphragm mounted in said base and connected to said latch means, means to admit water into the base when the portion of the craft on which the base is mounted is submerged in water whereby hydrostatic pressure in the base and against said operating means causes the latter to operate said latch means to release the container and permit the latter to float to the surface, said operator causing the switch means to permit the electrical system to operate when the container separates from the base or the fragile tube is broken to release the fluid from the chamber.

5. Signalling apparatus as claimed in claim 4 in which said switch means comprises a switch in the electrical operating system and said operator comprises a finger mounted on the base and extending from the base chamber into the container and normally retaining said switch open, said switch closing when freed of the finger, and a diaphragm positioned in the base chamber and engaging the finger, the fluid in said chamber normally pressing against the diaphragm to retain said finger in its normal position.

6. Signalling apparatus as claimed in claim 4 including resilient means normally compressed between the base and the container which, when the latch means releases the container, forces said container away from the base.

7. Signalling apparatus as claimed in claim 4 in which said latch means comprises a latch arm swingably mounted in the base and projecting into the container and having a catch thereon for engaging a keeper on the container, said operating means being operable to move the catch away from the keeper.

8. Signalling apparatus as claimed in claim 7 in which said operating means comprises means connecting one face of the diaphragm to the latch arm, and pressure means on an opposite face of the diaphragm resiliently retaining the diaphragm in a position to retain the latch catch in engagement with said keeper, water pressure on said one face of the diaphragm moving said catch away from the keeper.

9. Signalling apparatus for attachment to aircraft and operable when the aircraft crashes, comprising a buoyant container having therein signalling means and a self-contained electrical operating system therefor, a base mountable on an aircraft at an outer surface thereof, latch means releasably securing the container to the base, operating means in the base for said latch means and operable by hydrostatic pressure to cause said latch means to release the container and permit the latter to float to the surface when the portion of the craft on which the base is mounted is submerged in water, said latch means comprising a latch arm movably mounted on the base and projecting into the container and having a catch thereon for engaging a keeper on the container, said operating means on being operated moving the catch away from the keeper.

10. Signalling apparatus as claimed in claim 9 in which said operating means comprises a diaphragm, means connecting one face of the diaphragm to the latch arm, and pressure means on an opposite face of the diaphragm resiliently retaining the diaphragm in a position to retain the latch catch in engagement with said keeper, water pressure on said one face of the diaphragm moving said catch away from the keeper.

11. Signalling apparatus as claimed in claim 9 including resilient means normally compressed between the base and the container which, when the latch means releases the container, forces said container away from the base.

12. Signalling apparatus as claimed in claim 9 including switch means in said electrical operating system normally rendering said system inoperative, and an operator for the switch means for causing said switch means to permit the electrical system to operate when the container separates from the base.

13. Signalling apparatus as claimed in claim 12 in which said switch means comprises a switch in the electrical operating system, and said operator comprises a finger mounted on the base and projecting into the container and normally retaining said switch open, said switch closing when moved clear of the finger.

* * * * *